United States Patent Office 2,702,791
Patented Feb. 22, 1955

2,702,791

INHIBITING DEGRADATION OF QUEBRACHO DRILLING FLUIDS

Charles F. Teichmann, Crestwood, and Clifford G. Ludeman, Scarsdale, N. Y., assignors to Texaco Development Corporation, New York, N. Y., a corporation of Delaware No Drawing. Application April 2, 1952,
Serial No. 280,194

4 Claims. (Cl. 252—8.5)

The present invention relates to drilling subsurface wells or bore holes into underground formations and particularly to the drilling fluids or muds employed in such drilling operations.

More specifically, the invention concerns drilling operations involving the continuous circulation of such drilling fluids or muds downwardly through the drill stem, to and about the bit of a rotary drilling rig and thence upwardly between the drill stem and the walls of the bore hole for the purpose of tapping underground reservoirs of oil, gas, brine or water. In this operation, the drilling fluid serves to lubricate the drill stem and the bit, to transport the cuttings to the surface, to seal and hold in place the traversed walls of the bore hole, to impose a hydrostatic head upon the formation preventing the escape of high pressure fluids into the bore hole, and to perform numerous other functions.

The present invention is specifically applicable to such operations employing a water base drilling fluid or mud which, in addition to the usual suspension of clay, weighting agent and other typical mud constituent, depends upon small additions of a plant tannin extract such as quebracho for the purpose of controlling mud properties. The tannins, which term is meant to include the alkaline reaction products which result from addition of the extract to an alkaline mud, function as thinners to control the viscosity and thixotropy of the mud and are believed to act through a dispersive effect upon the mud gel structure which is reflected in a modification of mud viscosity. Also, the plant tannin derivatives exert another important effect in decreasing the fluid loss which occurs as the result of mud filtration along the wall of the bore hole. In addition, they tend to increase the strength and toughness of the filter cake thus formed on the walls of the bore hole.

As above intimated, the plant tannins are effective in relatively small proportions, as for example 0.5–5.0 pounds per barrel of mud, which, however, depends upon the specific mud to be treated, and is critical from the standpoint that their employment in excess, known as "overloading," may be detrimental.

In accordance with the present invention, the effective mud modifying properties of the plant tannin herein referred to as its "dispersive effect" or "dispersive properties" are inhibited or protected against deterioration in the drilling fluid by the presence of a protective agent consisting of formaldehyde, acetaldehyde, and polymers thereof, benzaldehyde, and furfuraldehyde in a small, effective proportion insufficient to cause mud flocculation or other harmful alteration of the drilling fluid. By formaldehyde, or acetaldehyde polymers, are meant the typical polymerization products such as paraformaldehyde, metaformaldehyde, or alpha-trioxymethylene and other polyoxymethylenes, as well as paraldehyde and metaldehyde.

The present invention follows from the discovery that, in solution in a typical drilling fluid, particularly in the presence of caustic or other alkaline material, a tannin dipsersant, such as quebracho, undergoes a progressive deterioration presumably due to oxidation, with an accompanying loss of dispersive properties. The present invention is concerned with overcoming or inhibiting this deterioration.

More specifically, solutions of quebracho have been found to decrease in mud modifying effectiveness upon contact with air, ultimately becoming relatively ineffective from the standpoint of mud viscosity modification, suppression of fluid loss and the other desired characteristics herein referred to as dispersive properties.

For example, a caustic-quebracho mud treating solution comprising 10 gms. of quebracho extract, 5 gms. of caustic soda and 100 ml. of water was aerated for a period of three weeks, and periodically tested for oxygen absorbing rate in a Burrell gas analyzer. In the initial absorption test the freshly prepared solution completely absorbed a test volume of oxygen in approximately 40 passes. However, after 24 hours aeration, only about 3% of the test volume of oxygen was absorbed after 60 passes through the solution, and, after three weeks of further aeration, the oxygen absorbing capacity of the solution was further decreased. These results indicate, therefore, a progressive absorption of the oxygen by the caustic-quebracho solution approaching an ultimate condition of saturation.

To determine the effect of oxygen absorption upon the properties of the plant tannin dispersant, one portion of the above treating solution was stored in a sealed, air-tight container, whereas a second portion was placed in a gas absorption container and subjected to aeration by a flow of air at the rate of 0.7 to 1.0 cubic foot per hour per 100 ml. of solution. After 16 days of aeration the sample was made up to the original volume with water and tested, in comparison with the first portion of treating solution, as an additive to a P-95 drilling mud. The results of these tests demonstrated a profound reduction in the dispersive effect of the aerated quebracho solution. For example, in the filtration tests, the aerated caustic-quebracho, in all cases, caused an actual increase in the rate of mud loss by the standard A. P. I. filtration test, indicating an essentially complete destruction of the water loss modifying properties of the quebracho.

The deflocculating power of the aerated caustic-quebracho solution likewise evidenced substantial impairment. For example, the following table lists the modification in viscosity of the mud treated respectively with the aerated and non-aerated solutions:

| Caustic-Quebracho Treating Solution | Quebracho, lb./bbl. mud | Percent change of Stormer viscosity at 600 R. P. M. |
|---|---|---|
| Aerated | 1.75 | −9.3 |
| Do | 3.50 | −5.8 |
| Non-aerated | 1.75 | −42.2 |
| Do | 3.50 | −56.8 |

Manifestly, therefore, the dispersive effect of the tannin component is seriously impaired by aeration in aqueous solution, particularly in the presence of caustic.

In accordance with the present invention, it has been discovered that the foregoing deterioration of the tannin dispersant and of its mud improving properties which occurs in aqueous media such as drilling muds or drilling fluids is overcome or inhibited by the presence of the foregoing protective agents, the dispersant fluid therefore maintaining its desired properties over long periods of time.

Accordingly, the primary advantage of the present invention resides in overcoming the deterioration of the vegetable tannin products and loss of their dispersant properties so that the amount of tannin extract required for mud formulation and maintenance is minimized and the process of drilling is accordingly rendered more economical.

As above indicated, the foregoing protective materials are effective to substantially overcome deterioration of the vegetable tannin product when present in relatively small concentrations in the aqueous, alkaline drilling fluid.

Such concentrations are in the order of about 0.001 to about 0.2 pound per barrel of drilling fluid. In general, formaldehyde is highly effective in concentrations of from about 0.006 to about 0.06 pound per barrel of mud, whereas in the case of benzaldehyde the optimum concentration is usually in the range of about 0.021 to 0.21 pound per barrel. The others fall in the intermediate ranges of optimum concentrations.

On the other hand, substantial protection of the plant tannin may be realized with concentrations of the protective material which are even lower than the foregoing, in amounts ordinarily considered to be mere traces, as for example, as low as 0.001 pound per barrel. Somewhat increased concentrations above the foregoing ranges are not ordinarily detrimental and may be tolerated up to about 0.5 pound per barrel without any adverse effect on the drilling fluid or without tendency to flocculate suspended mud particles.

It is also contemplated currently replenishing the protective agent to allow for mud loss and mud contamination as well as for consumption of the protective agent encountered during drilling. For example, relatively small quantities may be admixed with the mud at suitable operating intervals as required. Since the extent of mud contamination or loss, or the intensity of the deteriorating influences are not normally predictable, it is preferable merely to maintain a current, desired concentration of protective agent in the mud. Alternatively, since the requirement for supplemental protective agent is reflected by deterioration in the dispersing effect, for example, supplemental additions of both dispersant and protective agent may be made in response to a detectable filtration loss of the mud.

As above intimated, the present invention is applicable to aqueous quebracho-containing drilling muds which, in general, are typically formulated as a suspension of common clays together with specialized drilling clays such as bentonite and weighting agents such as barytes and iron oxide, and may contain many other conventional additives. Ordiarily, the drilling fluid is rendered alkaline by the addition of caustic, sodium silicate or the like, and may range from the low alkalinity muds having a pH about 7 to 9 to relatively high alkalinity muds with pH values ranging upwardly from pH 9 and frequently as high as 11.0 to 12.5. It is to the moderate and high alkalinity muds that the invention is particularly applicable due to the accelerated decomposition which the tannin dispersant tends to undergo in such media.

The invention is also applicable to tannin drilling fluids containing starchy and proteinaceous materials incorporated to improve the so-called wall forming characteristics of the mud and increase resistance to loss of fluid through the so-called wall or filter cake deposited by the mud on formation surfaces along the bore hole.

The protective agent may be added to the mud during drilling in the usual manner of mud formulation by the aid of mud mixers in the drilling pit or in any other conventional means. In the case of formaldehyde and acetaldehyde which are relatively volatile, it is preferred to make the addition in the form of an aqueous solution as for example by use of commercial formalin solution of about 40% strength, or by solutions of any other convenient strength.

One example of a drilling mud conforming to the present invention comprises the P-95 mud, above mentioned, a high quality mud from Rosamond, California, to which is added about 2.0 pounds per A. P. I. barrel of quebracho and about 1.0 pound of caustic soda. To this mixture there is added and carefully distributed therethrough about 0.04 pound of acetaldehyde per barrel. The resulting mud remains at its compounded viscosity and water loss values over long, indefinite periods of atmospheric exposure as long as the concentration of acetaldehyde in the mud is maintained at the originally adjusted value.

The present invention is also applicable to aqueous tannin-containing drilling fluids which, in addition to or in place of suspended clays, include a dispersed oil phase formed of various fractions of crude or refined oil suitably emulsified in the aqueous phase in accordance with known practice.

In general, therefore, the invention comprehends stabilizing and protecting the effective properties of plant tannin materials in a drilling fluid comprising water, particularly under conditions of substantial alkalinity.

Expressions such as "plant tannin extracts" and "plant extract materials" as used herein are intended to include quebracho extracts as well as such forms as the quebracho may take in drilling of the aqueous fluids, particularly under other alkaline conditions. Since, however, the desired dispersant properties are dependent upon the tannin constituents of the extract, the foregoing terms as used herein mean also the other and equivalent plant tannin extracts and derivatives, as for example, chestnut, divi-divi, gambier, hemlock, quercitron, osage, and the like, as well as tannic acid and gallic acid salts normally occurring as constituents of the drilling mud as a result of addition thereto of the plant tannin derivative.

Obviously, many modifications and variations of the above invention as herein set forth may be made without departing from the spirit and scope thereof, therefore, only such limitations should be imposed as are indicated in the appended claims.

We claim:

1. In the drilling of a well bore through subsurface ground formations with a rotary drill wherein an aqueous, alkaline drilling fluid is continuously circulated through the drill stem and about the bit of a rotary drilling rig, said drilling fluid containing a viscosity controlling additive of the class consisting of the plant tannin materials, the improvement which comprises circulating an aqueous alkaline drilling fluid having incorporated therein a protective agent effective to overcome the normal oxidative deterioration of said plant tannin material, said protective agent comprising an organic aldehyde of the class consisting of formaldehyde, acetaldehyde, and polymers thereof, benzaldehyde, and furfuraldehyde.

2. In the drilling of a well bore through subsurface formations with a rotary drill wherein an aqueous drilling fluid is continuously circulated through the drill stem and about the bit of a rotary drilling rig, said drilling fluid containing a viscosity controlling additive of the class consisting of the plant tannin materials, the improvement which comprises circulating an aqueous drilling fluid containing an additive effective to protect said plant tannin material contained therein against oxidative deterioration, said additive comprising any compounds of the class consisting of formaldehyde, acetaldehyde and polymers thereof, benzaldehyde, and furfuraldehyde.

3. A drilling fluid composition comprising an aqueous, alkaline mud containing an additive of the class consisting of the plant tannin materials in an amount sufficient to substantially decrease mud viscosity and additionally including a protective agent effective to overcome the oxidative deterioraiton of said plant tannin material in said aqueous, alkaline solution, said protective agent comprising an organic material of the class consisting of formaldehyde, acetaldehyde and polymers thereof, benzaldehyde, and furfuraldehyde.

4. A drilling mud as defined in claim 3 wherein said protective agent is present in a quantity ranging from about 0.005 to about 0.5 pound per barrel of said drilling fluid.

References Cited in the file of this patent

UNITED STATES PATENTS

| Number | Name | Date |
|---|---|---|
| 889,059 | Stiegelmann et al. | May 26, 1908 |
| 2,331,281 | Wayne | Oct. 12, 1943 |
| 2,417,307 | Larsen | Mar. 11, 1947 |
| 2,560,930 | Campise | July 17, 1951 |
| 2,579,453 | Post et al. | Dec. 25, 1951 |